No. 762,601. PATENTED JUNE 14, 1904.
A. J. SMITHSON.
MEANS FOR STORING OIL.
APPLICATION FILED JULY 23, 1903.
NO MODEL.
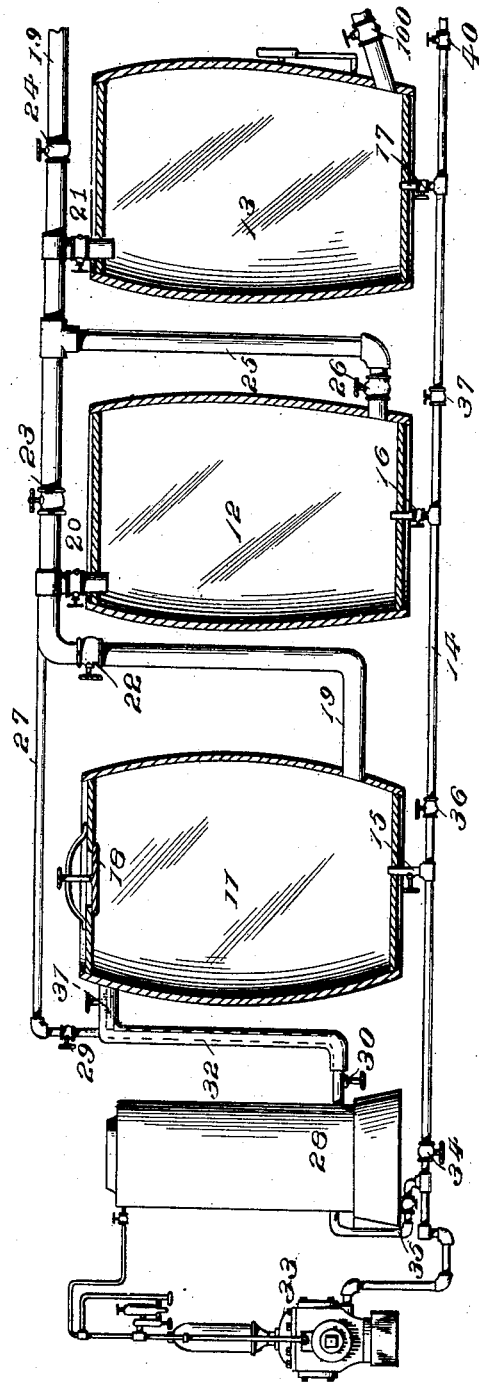

No. 762,601.

Patented June 14, 1904.

UNITED STATES PATENT OFFICE.

ALEXANDER J. SMITHSON, OF PORTLAND, OREGON.

MEANS FOR STORING OIL.

SPECIFICATION forming part of Letters Patent No. 762,601, dated June 14, 1904.

Application filed July 23, 1903. Serial No. 166,744. (No model.)

*To all whom it may concern:*

Be it known that I, ALEXANDER J. SMITHSON, a citizen of the United States, residing at Portland, in the county of Multnomah and State of Oregon, have invented certain new and useful Improvements in Means for Storing Oil, of which the following is a specification.

The primary object of this invention is the safe storage of oil, whereby danger from fire and explosion is reduced to the smallest amount possible.

The invention contemplates a connected series of tanks and means for preventing the formation of a vacuum in any one of the said tanks, so that no space for the accumulation of gases is provided. The tanks are kept filled either with oil or water, or both, the water being utilized to force the oil from the tanks to the place of use and to take the place of the oil used, whereby no possible space can exist for the formation and accumulation of gas.

For a full description of the invention and the merits thereof and also to acquire a knowledge of the details of construction of the means for effecting the result reference is to be had to the following description and drawing hereto attached.

While the essential and characteristic features of the invention are susceptible of modification, still the preferred embodiment of the invention is illustrated in the accompanying drawing, which is a sectional detail of a connected series of tanks utilizing water for displacing the oil.

A series of three tanks 11, 12, and 13 is shown connected to a water-pipe 14 by means of valved branches 15, 16, and 17. The tank 11, the first of the series, is provided with a manhole 18, through which the oil is supplied to the tanks in any desired manner. A pipe 19 connects with the lower portion of the tank 11 and extends upward and over the tanks 12 and 13 and has connection therewith by means of valved branches 20 and 21. The pipe 19 is provided in its length with valves 22, 23, and 24, the valve 22 being located between the tank 11 and the valved connection 20, the valve 23 being arranged between the valved connections 20 and 21, and the valve 24 being located beyond the valved connection 21. A pipe 27 connects the pipe 19 with the burner of the steam-boiler 28 and is provided with valves 29 and 30. A valved branch pipe 31 connects the pipe 27 with the upper portion of the tank 11. To prevent injury to the exposed portion of the pipe 27, the same is protected by means of a pipe or covering 32.

The numeral 33 designates a pump of any kind adapted to be operated by steam derived from the boiler or generator 28. This pump is connected with the water-pipe 14 for supplying the same with water under pressure. A valve 34 in the length of the water-pipe 14, near its connection with the pump 33, provides for regulating the passage of the water through the pipe 14. A valved pipe 35 connects the pipe 14 with the boiler, so as to supply the same with water. Valves 36 and 37 are interposed in the length of the pipe 14 and are arranged between the valved connections 15 and 16 and 16 and 17, respectively.

The tanks being connected in series and the several valves 22, 20, 23, 26, and 21 being opened and valve 24 closed, unless more tanks are added oil supplied to the tank 11 under sufficient head or pressure through the connection or valve 18 passes from said tank into the tank 12 and from thence into the tank 13. After the tanks have been filled the several valves previously opened are closed. Water is now supplied to the pipe 14 under pressure, and the oil may be used from any one of the tanks. Suppose tank 13 be selected. Valves 17, 34, 36, and 37 are opened to admit the water under pressure into the tank 13, and the valves 21, 23, 29, and 30 are opened, thereby admitting the oil to pass from the tank 13 through the parts 21, 23, 29, and 30 and pipe 27 into the boiler-furnace or to the required point of use. If it is desired to draw the oil from tank 12, the valves 16, 20, 29, and 30 are opened. The oil may be used from the tank 11 exclusively by opening the valves 15, 31, and 30. Should it be determined to use the oil from the tanks in succession, the valves 30, 31, 22, 20, 26, 21, and 17 are opened, thereby permitting the water under pressure to enter the lower portion of the tank 13 and the oil to pass from said tank 13 into the tank 12 through connections 21, 26, and 25 and from tank 12 into tank 11 through the connections 20, 22, and 19 and from tank 11 to the required point of use through the parts 31 and 30. After the oil has been used from the series of tanks the latter will be full of water, and in order to refill the same with oil the manhole 18 and valves 22, 20, 26, and 21 are opened, thereby providing for a discharge of the water through tanks 12 and 13 out through pipe and valve 100. The oil supplied to the tank 11 passes therefrom through pipe 19 and connection 20 into the tank 12, and when the latter is filled it passes on into tank 13 through connection 25 and valves 26 and 21 and out through pipe and valve 100. The pressure may be obtained from pump 33, city water-main, or other source, as found most convenient, according to the location and surroundings in which the invention may be installed.

From the foregoing it will be understood that the tanks may be supplied with oil in rotation and that the oil may be used from any one of the tanks or from the series, as required.

Having thus described the invention, what is claimed as new is—

In means for storing oil, a plurality of tanks, a pipe for supplying water to the tanks under pressure, valve connections between said pipe and the respective tanks, an oil-pipe, valved pipes connecting said oil-pipe with the lower portion of the tanks, and pipe 27 of less diameter than the oil-pipe and connected thereto and provided with controlling-valves, substantially as specified.

In testimony whereof I affix my signature in presence of two witnesses.

ALEXANDER J. SMITHSON. [L. S.]

Witnesses:
M. E. THOMPSON,
L. C. COLEMAN.